(12) United States Patent
Michishita

(10) Patent No.: US 9,110,760 B2
(45) Date of Patent: Aug. 18, 2015

(54) IMAGE FORMING APPARATUS, CONTROL METHOD FOR IMAGE FORMING APPARATUS, AND STORAGE MEDIUM

(71) Applicant: CANON KABUSHIKI KAISHA, Tokyo (JP)

(72) Inventor: Takumi Michishita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/055,283

(22) Filed: Oct. 16, 2013

(65) Prior Publication Data

US 2014/0115572 A1 Apr. 24, 2014

(30) Foreign Application Priority Data

Oct. 22, 2012 (JP) ................................. 2012-232923

(51) Int. Cl.
*G06F 9/445* (2006.01)

(52) U.S. Cl.
CPC ........................................ *G06F 8/65* (2013.01)

(58) Field of Classification Search
None
See application file for complete search history.

(56) References Cited

U.S. PATENT DOCUMENTS 6,971,095 B2 * 11/2005 Hirai et al. .................... 717/173

FOREIGN PATENT DOCUMENTS

| JP | 2006-72761 A | 3/2006 |
| JP | 2006-221224 A | 8/2006 |

* cited by examiner

*Primary Examiner* — Chuck Kendall
(74) *Attorney, Agent, or Firm* — Canon USA, Inc., I.P. Division

(57) ABSTRACT

An image forming apparatus reduces downtime of the apparatus caused by firmware updates. When a function relating to an option unit not connected to the image forming apparatus is the update target, firmware of the image forming apparatus is not updated.

10 Claims, 9 Drawing Sheets

```
301
[Version.00.02]
[CORRECTION CONTENT]
SADDLE STITCH BOOKBINDING
PROBLEM CORRECTION

[RELATED OPTIONS]
STAPLE FINISHER

[RELATED LICENSES]
NONE

[INTENDED DESTINATION]
ALL DESTINATIONS

[FIRMWARE VERSION]
V00.01 AND AFTER
```

```
302
[Version.00.03]
[CORRECTION CONTENT]
JOB LOCK PROBLEM

[RELATED OPTIONS]
IMAGE ANALYSIS BOARD

[RELATED LICENSES]
JOB LOCK FUNCTION

[INTENDED DESTINATION]
ALL DESTINATIONS

[FIRMWARE VERSION]
V00.01 AND AFTER
```

```
303
[Version.00.04]
[CORRECTION CONTENT]
PDL FUNCTION EXPANSION

[RELATED OPTIONS]
NONE

[RELATED LICENSES]
PCL

[INTENDED DESTINATION]
INTENDED FOR EUROPE

[FIRMWARE VERSION]
V00.01 AND AFTER
```

```
304
[Version.00.05]
[CORRECTION CONTENT]
MULTI-LINE FAX
COMMUNICATION PROBLEM

[RELATED OPTIONS]
FAX EXPANSION OPTION

[RELATED LICENSES]
NONE

[INTENDED DESTINATION]
ALL DESTINATIONS

[FIRMWARE VERSION]
V00.04 AND AFTER
```

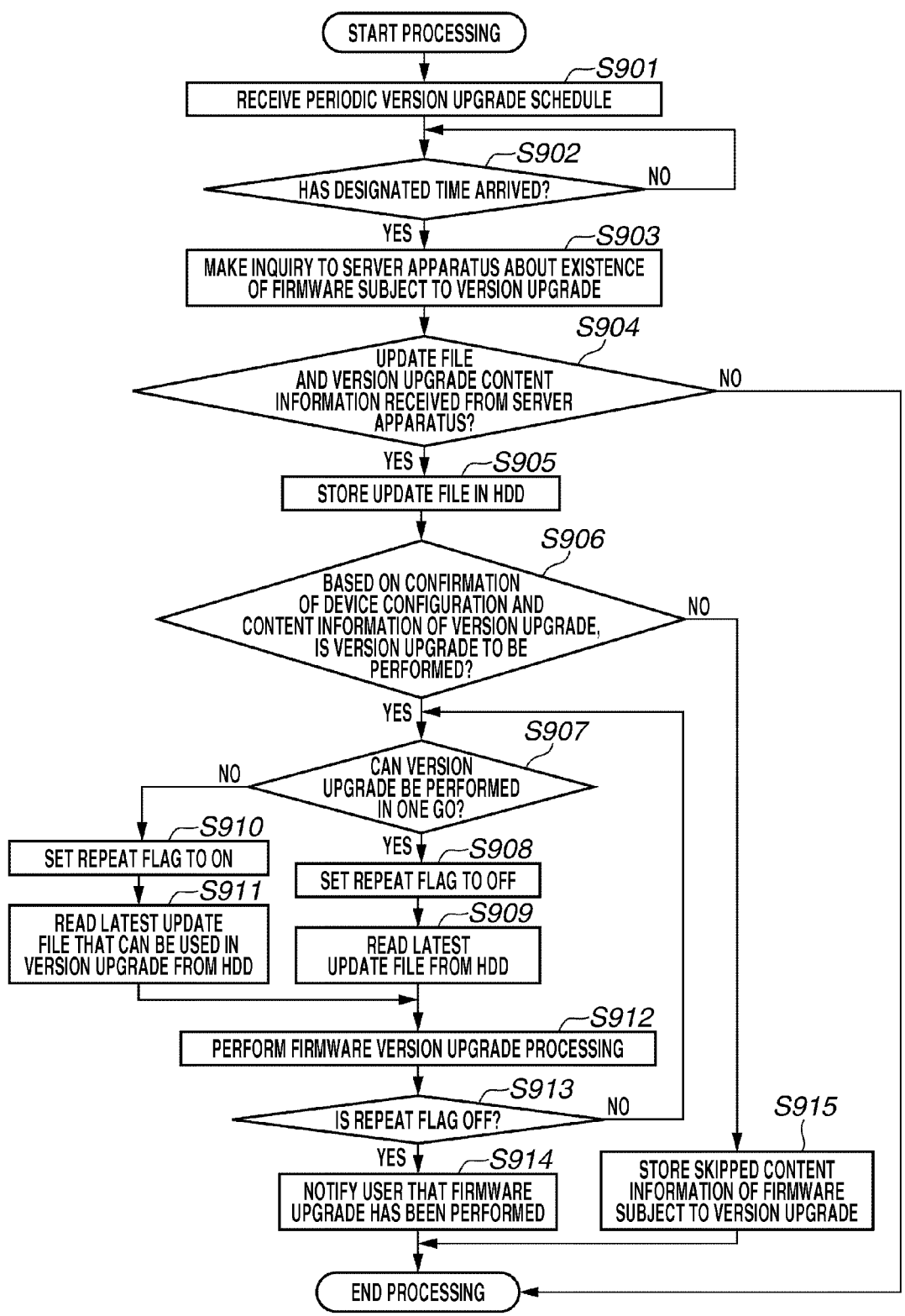

IMAGE FORMING APPARATUS, CONTROL METHOD FOR IMAGE FORMING APPARATUS, AND STORAGE MEDIUM

BACKGROUND OF THE INVENTION

1. Field of the Invention

The present invention relates to an image forming apparatus, a control method for the image forming apparatus, and a storage medium.

2. Description of the Related Art

With a rapid increase in functions in an image forming apparatus, it is necessary to update firmware of such an image forming apparatus quickly and efficiently (at low cost). Conventionally, when a need arose to perform an update due to a version upgrade or a problem, a service person would visit a customer and manually perform the update. Therefore, not only was it impossible to perform the update quickly, but it took time and money to dispatch the service person to perform the firmware update.

Accordingly, recently, a technology has been proposed for performing a firmware update by configuring the image forming apparatus so as to store the firmware on a rewritable storage device, such as a flash memory, and transmitting the firmware via the Internet.

For example, Japanese Patent Application Laid-Open No. 2006-72761 discusses a technology relating to a portable electronic device capable of communicating with an update server via a communication line. The portable electronic device discussed in Japanese Patent Application Laid-Open No. 2006-72761 performs an update by automatically accessing the update server at a predetermined timing, requesting an update, and receiving the firmware transmitted from the update server in response to that request. Further, the portable electronic device discussed in Japanese Patent Application Laid-Open No. 2006-72761 stops firmware reception when the voltage in a battery source drops below a predetermined value.

In addition, like in Japanese Patent Application Laid-Open No. 2006-221224, a method has also been proposed in which a version upgrade is automatically performed based on the reception of an e-mail from an information providing server, or by setting in advance a version upgrade time. In this method, since the latest software can be automatically determined, the target software can be upgraded to the latest version without a user having to perform a special operation.

Thus, recently, instead of the method in which the service person manually performs a firmware update, it has now become mainstream to automatically perform an update on a personal computer (PC) or an image forming apparatus by downloading firmware from a server.

In a device that provides a plurality of functions like an image forming apparatus, the functions that can be used can change based on the configuration of option devices and licenses that are installed at the user's discretion. More specifically, although functions such as saddle stitching and bookbinding of a document are available for users who have installed a finisher option, such functions cannot be used by users who have not installed the finisher option. Similarly, for a job lock, the functions that are available differ depending on whether the user has purchased an image analysis kit or not.

When the methods discussed in Japanese Patent Application Laid-Open Nos. 2006-72761 and 2006-221224 are used, a version upgrade can be performed on a device by periodically accessing a software server and finding the latest software. However, since the software provided from the software server includes corrections and function improvements for various functions, this may result in the user performing corrections for functions that he/she cannot use.

Version upgrade processing in an image forming apparatus requires consideration to be given to the download time and the time taken to overwrite software, including the processing to restart the image forming apparatus a plurality of times. Consequently, the period while the version upgrade processing is being performed becomes downtime, which causes problems such as making it impossible to receive faxes and preventing print processing of the data transmitted from the PC from being performed.

SUMMARY OF THE INVENTION

The present invention is directed to reducing downtime of a product function caused by firmware updates.

According to an aspect of the present invention, an image forming apparatus to which an option unit can be connected includes an update unit configured to update firmware of the image forming apparatus based on an update file, a specification unit configured to specify update content of the firmware of the image forming apparatus for a specific update file, a determination unit configured to, when the update content specified by the specification unit is an update of a function relating to a specific option unit, determine whether the specific option unit is an option unit connected to the image forming apparatus, and a control unit configured to control the update unit to update the firmware of the image forming apparatus based on the specific update file when it is determined by the determination unit that the specific option unit is an option unit connected to the image forming apparatus, and to control the update unit not to update the firmware of the image forming apparatus based on the specific update file when it is determined by the determination unit that the specific option unit is not an option unit connected to the image forming apparatus.

Further features and aspects of the present invention will become apparent from the following detailed description of exemplary embodiments with reference to the attached drawings.

BRIEF DESCRIPTION OF THE DRAWINGS

FIG. 9 is a flowchart illustrating an example of firmware update processing according to a second exemplary embodiment.

DESCRIPTION OF THE EMBODIMENTS

Various exemplary embodiments, features, and aspects of the invention will be described in detail below with reference to the drawings.

Figure 1:
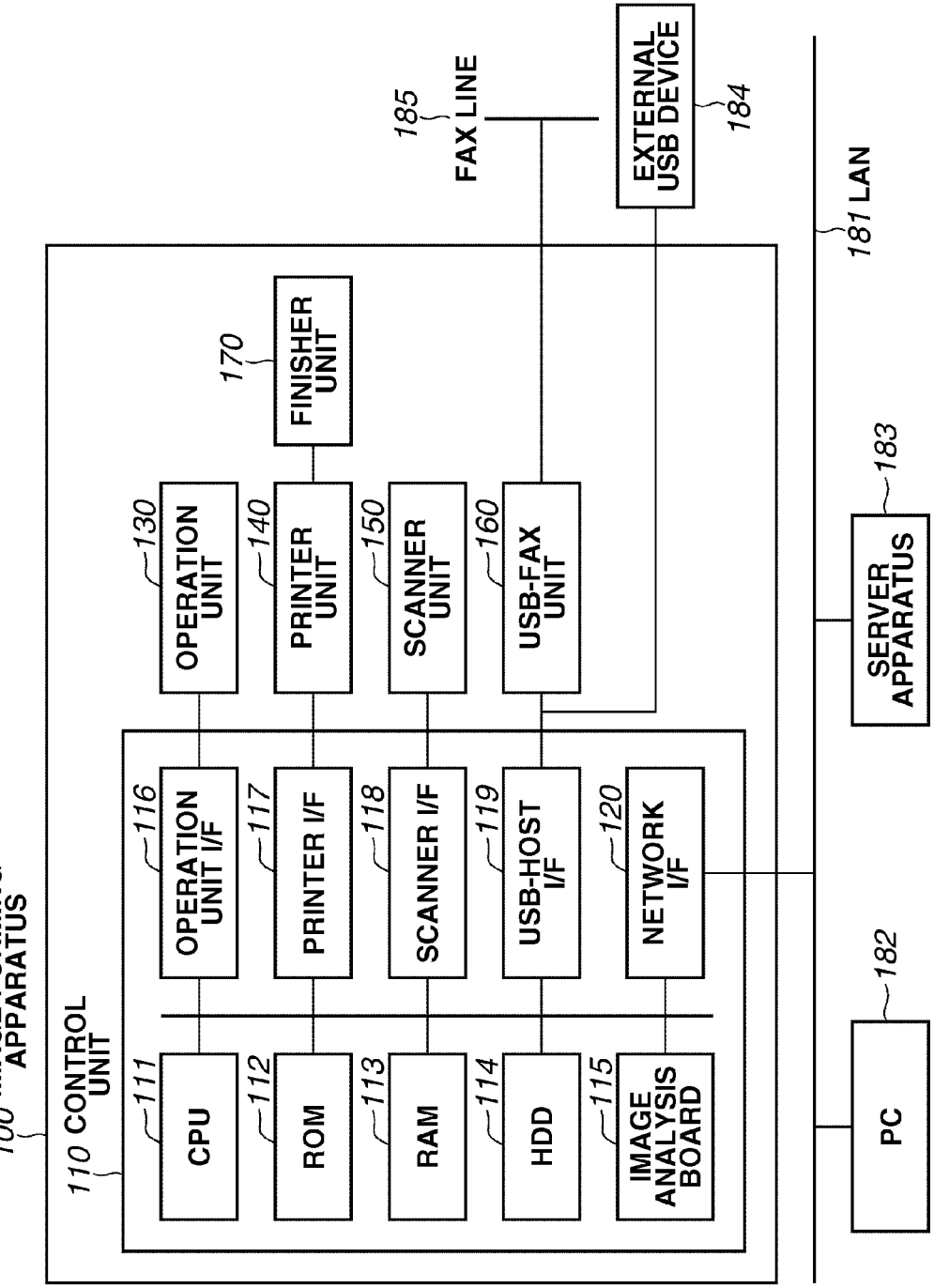
FIG. 1 illustrates an example of a hardware configuration of an image forming apparatus.

FIG. 1 illustrates an example of a hardware configuration of an image forming apparatus 100.

In FIG. 1, a control unit 110 is a unit for controlling the whole image forming apparatus 100. The control unit 110 includes the following units for controlling the image forming apparatus 100.

A central processing unit (CPU) 111 reads a program for the control unit 110 that is stored in a read-only memory (ROM) 112 into a random-access memory (RAM) 113, and executes the read program. Device information, such as licenses, device configuration information, and firmware version, is also stored in the ROM 112.

A hard disk drive (HDD) 114 stores print data received from a PC 182 via a network interface (I/F) 120. Examples of a program executed by the CPU 111 is a print application program. When the CPU 111 executes processing based on this print application program, print data stored in the HDD 114 is converted into image data that can be printed by a printer unit 140. In addition, the image data that can be printed by the printer unit 140 is also stored in the HDD 114. Further examples of a program executed by the CPU 111 is a scanner application program. When the CPU 111 executes processing based on this scanner application program, image data is read by a scanner unit 150 and the read image data is transferred to the HDD 114. In addition, the read image data is also stored in the HDD 114.

An image analysis board 115 is a hardware unit for transmitting to the CPU 111 an instruction regarding whether to output to the printer unit 140 by analyzing the image data read by the scanner unit 150 and reading copy-prohibited information, for example.

An operation unit I/F 116 is an interface for transmitting to the CPU 111 instructions input by a user of the image forming apparatus 100 via an operation unit 130. Further, the operation unit I/F 116 receives from the CPU 111 processing content for switching the content displayed on the operation unit 130, and transmits the received processing content to the operation unit 130. The operation unit 130, which includes a liquid crystal display unit having a touch panel function or a keyboard, for example, receives user instructions.

A printer unit I/F 117 is an interface for connecting the printer unit 140 with the control unit 110. The printer unit 140 performs printing on a recording medium based on image data transferred from the HDD 114 via the printer unit I/F 117.

A finisher unit 170 performs various types of finishing processing on the recording medium on which printing was performed by the printer unit 140. Examples of finishing processing include stapling sheets, punching (hole forming processing) a sheet, saddle stitch bookbinding and the like.

A scanner unit I/F 118 is an interface for connecting the control unit 110 and the scanner unit 150. The scanner unit 150 reads an image on a document as image data using a line sensor configured from a charge-coupled device (CCD) or the like. Further, the scanner unit 150 transfers the read image data to the HDD 114 via the scanner unit I/F 118. The image data transferred and stored in the HDD 114 can be printed by the printer unit 140. Printing the image data read by the scanner unit 150 with the printer unit 140 enables copying processing to be performed.

A universal serial bus (USB)-Host I/F 119 is an interface for connecting the control unit 110 and a USB-FAX unit 160.

The USB-FAX unit 160 performs FAX transmission via a FAX line 185 based on the image data transferred from the HDD 114 via the USB-Host I/F 119. Further, the USB-FAX unit 160 generates image data based on data received via the FAX line 185, and transfers the generated image data to the HDD 114 via the USB-Host I/F 119. The image data stored in the HDD 114 is printed on a recording medium by the printer unit 140 in the same manner as described above. The USB-Host I/F 119 can also connect with an external USB device 184. Examples of the USB device 184 may include a USB memory, a USB keyboard and the like.

A network I/F 120, which connects the control unit 110 to a local area network (LAN) 181, performs communication with the PC 182 that is on the LAN. The PC 182, which is connected to the image forming apparatus 100 via the LAN 181, can transmit print data to the image forming apparatus 100 and perform device operations on the image forming apparatus 100 via a web browser. Further, the PC 182, which is connected to a server apparatus 183 via the LAN 181, can download an update file that is required for a firmware update. Examples of the protocol for downloading the update file include, but are not limited to, hypertext transfer protocol (HTTP) and file transfer protocol (FTP). Although the server apparatus 183 is usually located on the Internet, it may also be located on a corporate network. The hardware configuration of the PC 182 and the server apparatus 183 may be the same as a typical computer. The functions of each apparatus are realized by their respective CPUs executing processing based on programs stored in a memory such as an HDD.

In the configuration of the image forming apparatus 100, the image analysis board 115, the finisher unit 170, and the USB-FAX unit 160 are selectively connected by the user as options. The basic functions of the image forming apparatus 100, such as scanning and printing, can still be used even if an option is not connected.

Figure 2:
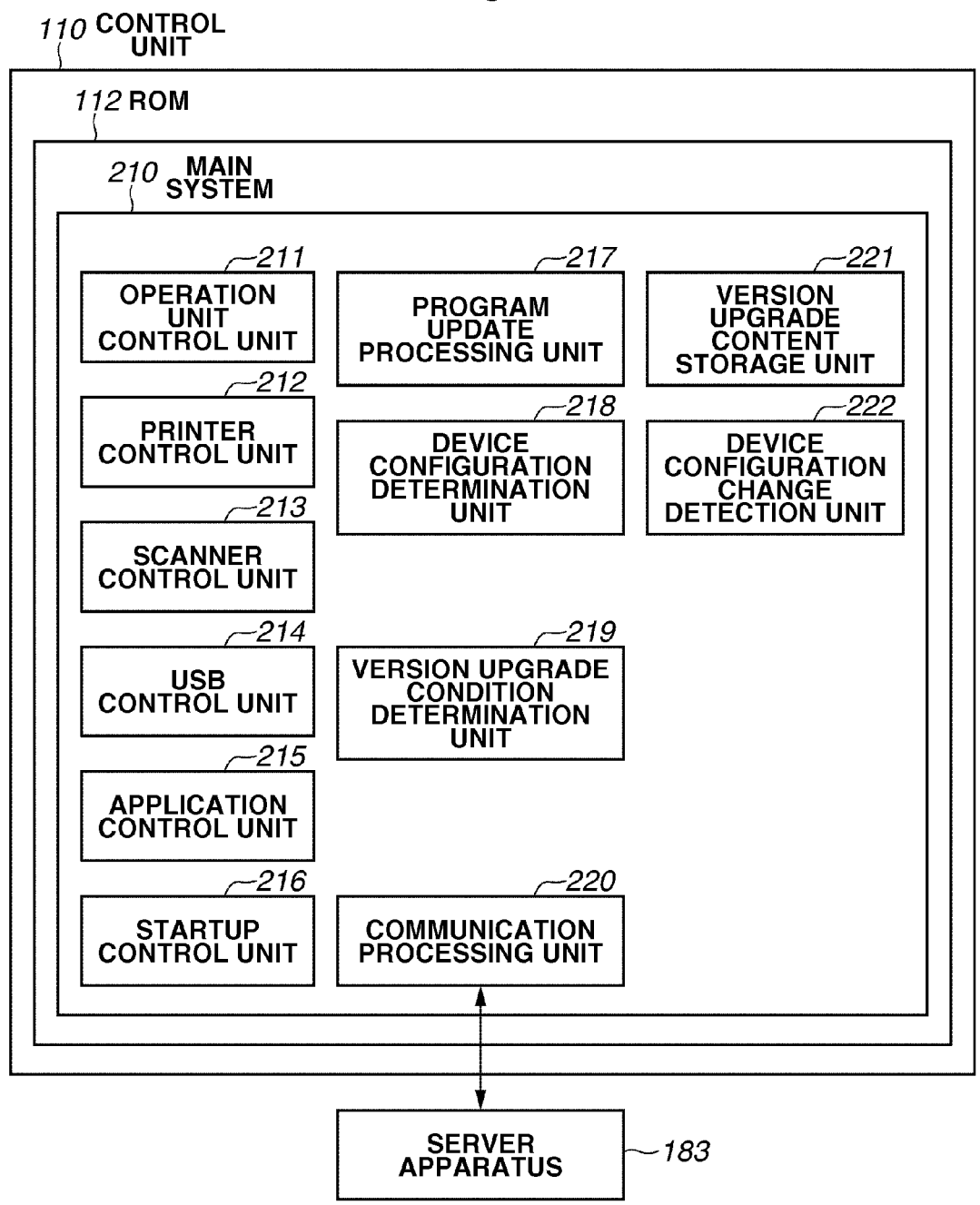
FIG. 2 illustrates an example of a software configuration of the image forming apparatus.

The software configuration realized by the CPU 111 in the control unit 110 executing programs stored in the ROM 112 will now be described with reference to FIG. 2. FIG. 2 illustrates an example of a software configuration of the image forming apparatus 100.

Various function modules of the image forming apparatus 100 according to the present exemplary embodiment are arranged in a main system 210.

An operation unit control unit 211 controls the operation unit 130 via the operation unit I/F 116.

Similarly, a printer control unit 212 controls the processing of the printer unit 140 via the printer unit I/F 117 and the processing of the finisher unit 170. A scanner control unit 213 controls the scanner unit 150 via the scanner unit I/F 118. Similarly, a USB control unit 214 controls a connected USB device via the USB-Host I/F 119.

An application control unit 215 includes modules for realizing the various functions of the image forming apparatus 100. However, the application control unit 215 does not directly control an external device. The application control unit 215 includes a hypertext transfer protocol daemon (HTTPd), a line printer daemon (lpd), a Web browser function, a device information distribution function and the like.

A startup control unit 216 controls a startup and shutdown of the main system 210. After power to the image forming apparatus 100 has been turned on, the startup control unit 216 is the first unit to operate, and controls a startup process of the whole main system 210.

A program update processing unit 217 performs update processing of the various processing units in the main system 210 when an instruction to execute a firmware version upgrade is received from the user via the operation unit 130, or when a pre-set version upgrade schedule has been reached.

A device configuration determination unit 218 acquires device information (licenses, device configuration information, firmware version etc.) stored by the image forming apparatus 100 in the ROM 112.

A version upgrade condition determination unit 219 determines whether to perform a version upgrade by comparing the information acquired by the device configuration determination unit 218 and a version upgrade execution condition received from the server apparatus 183 by a below-described communication processing unit 220.

The communication processing unit 220 performs communication with the server apparatus 183, and performs transfer processing of the update file required for the firmware version upgrade and the version upgrade execution condition.

If it is determined by the version upgrade condition determination unit 219 not to perform a version upgrade, a version upgrade content storage unit 221 performs processing to store data (firmware content information) regarding the version upgrade condition for which version upgrade processing was skipped. The version upgrade content storage unit 221 stores the firmware content information for which version upgrade processing was skipped in the HDD 114.

A device configuration change detection unit 222 includes a function of detecting changes in the device configuration, such as the fact that option hardware has been connected or a license for a new function has been obtained, for example.

Figure 3:
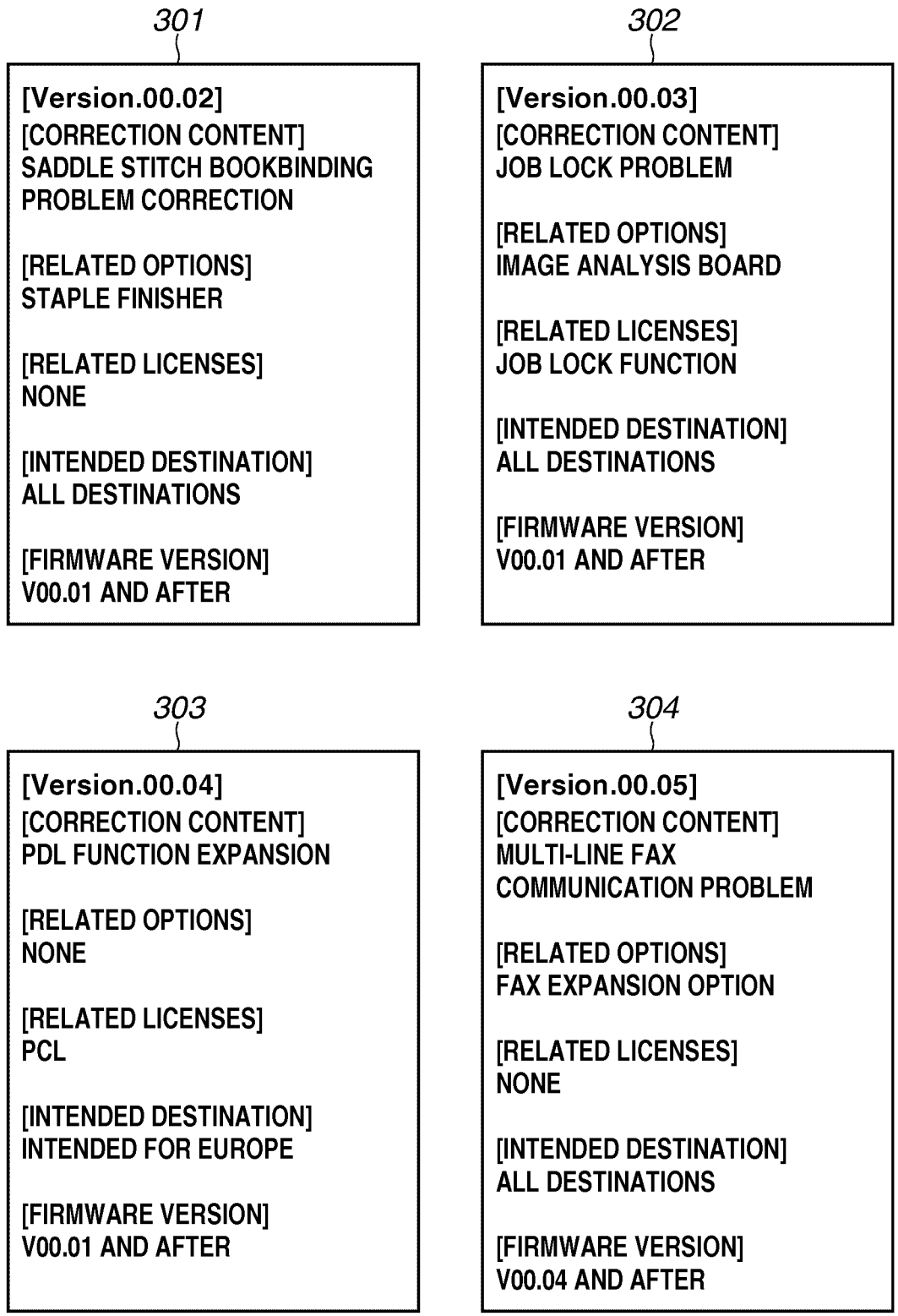
FIG. 3 illustrates an example of content information about firmware that is subject to a version upgrade (update) received by the image forming apparatus from a server apparatus.

FIG. 3 illustrates an example of content information about the firmware that is subject to a version upgrade (update) received by the image forming apparatus 100 from the server apparatus 183.

When the image forming apparatus 100 makes an inquiry to the server apparatus 183 during version upgrade execution, the image forming apparatus 100 receives content information about the firmware subject to a version upgrade like that illustrated in FIG. 3.

Content information 301 indicates that firmware Version.00.02 is registered in the server apparatus 183, that this upgrade corrects a problem with saddle stitch bookbinding, and that the related option required to use that function is the staple finisher. Further, content information 301 indicates that the intended destination of image forming apparatuses is for all destinations.

If the result of the inquiry by the image forming apparatus 100 to the server apparatus 183 is that the received content information about the firmware subject to a version upgrade is only content information 301, the image forming apparatus 100 determines that it is not necessary to perform a version upgrade for devices that are not connected to a staple finisher.

Similarly, content information 302 about the firmware subject to a version upgrade indicates that this upgrade is a version upgrade that corrects a problem with a job lock, and that this upgrade is effective for devices that are connected to an option image analysis board and into which a job lock function license has been entered.

Similarly, content information 303 about the firmware subject to a version upgrade indicates that this upgrade is a correction necessitated by expansion of a PDL function, and that this upgrade is effective for devices into which a PCL license has been entered. Since the content information describes that the intended destination is Europe, the fact that this upgrade is intended for Europe is added as a version upgrade condition.

Content information 304 about the firmware subject to a version upgrade indicates that this upgrade is a version that corrects a problem with multiline FAX transmission, and is for devices connected to a FAX expansion option. The content information describes that the software version is Version.00.04 or after. If, for example, the need arises for this version to be upgraded, the image forming apparatus 100 needs to first upgrade to Version.00.04, and then perform a version upgrade again. In this case, the image forming apparatus 100 performs processing to upgrade to Version.00.05 by performing a plurality of version upgrades based on the content information about the firmware subject to a version upgrade.

The description of the content information about the firmware subject to a version upgrade illustrated in FIG. 3 has been simplified in order to describe the present exemplary embodiment more easily. Accordingly, the content information can be changed in various ways based on the options that can be connected to the image forming apparatus, the supported licenses and the like.

Figure 4:
FIG. 4 illustrates an example of device information of the image forming apparatus.

FIG. 4 illustrates an example of device information of the image forming apparatus.

Information 401 is acquired by the device configuration determination unit 218. As illustrated in information 401, in this example, the information includes a serial ID, the firmware version, mounted options, registered licenses, and the intended destination. The version upgrade condition determination unit 219 determines whether a version upgrade needs to be performed by comparing the content information about the firmware subject to a version upgrade that was described with reference to FIG. 3 and the device information illustrated in FIG. 4. If the device information of the image forming apparatus has changed due to the connection of an option device, for example, the CPU 111 updates the device information as illustrated in FIG. 4.

Figure 5:
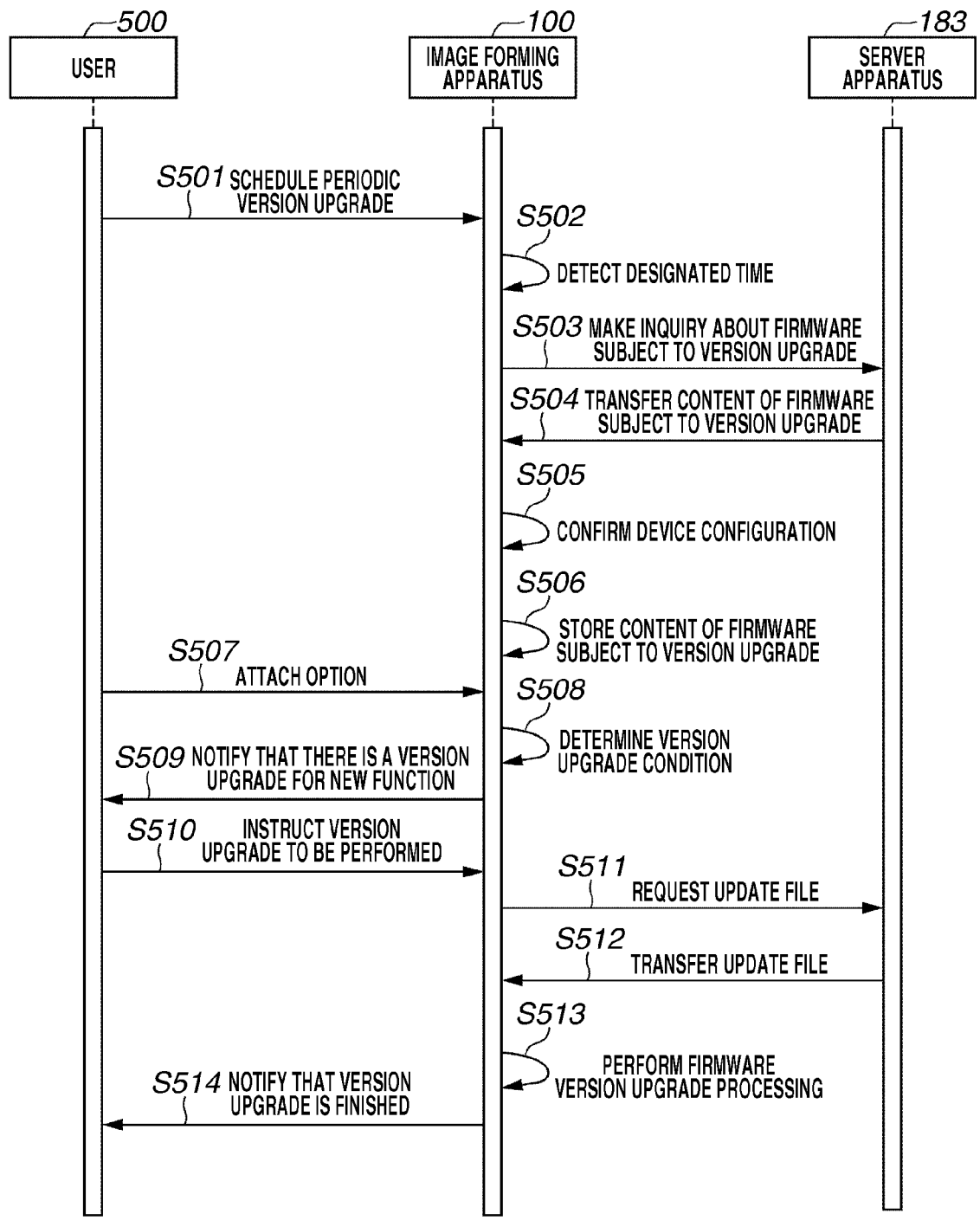
FIG. 5 is a sequence diagram illustrating an example of firmware update processing.

A sequence illustrating an example of the operations performed in the present exemplary embodiment will be described with reference to FIG. 5. FIG. 5 is a sequence diagram illustrating an example of firmware update processing.

In FIG. 5, a user 500 sends an instruction via the operation unit 130 to the image forming apparatus 100, or confirms the state of the image forming apparatus 100 by looking at the display on the operation unit 130. As described with reference to FIG. 2, the server apparatus transfers the content information about the firmware subject to a version upgrade and the update file based on a request from the image forming apparatus 100.

In step S501, the user 500 schedules a periodic version upgrade for the image forming apparatus 100. The periodic version upgrade is scheduled to be performed every Sunday at 12 o'clock. The periodic version upgrade can also be performed at a time selected by the user, such as 12 o'clock on the first day of each month.

In step S502, the image forming apparatus 100 detects that the designated time has been reached. Then, in step S503, the image forming apparatus 100 makes an inquiry to the server apparatus 183 via the communication processing unit 220 about firmware subject to a version upgrade.

In step S504, the server apparatus 183 transfers the content information about the firmware subject to a version upgrade among the registered firmware to the image forming apparatus. Such content information corresponds to the content information about the firmware subject to a version upgrade described with reference to FIG. 3.

In step S505, the device configuration determination unit 218 in the image forming apparatus 100 acquires the device information described with reference to FIG. 4. Further, the version upgrade condition determination unit 219 performs a comparison between the content information about the firmware subject to a version upgrade that was transferred in step S504 and the device information illustrated in FIG. 4. The case illustrated in FIG. 5 is based on the assumption that a version upgrade has been determined to be unnecessary. In such a case, the image forming apparatus 100 does not download the update file or perform firmware upgrade processing.

In step S506, the version upgrade content storage unit 221 in the image forming apparatus 100 stores the content information about the firmware subject to a version upgrade for which update processing was skipped.

Then, in step S507, a case is envisaged in which the user has attached an option additionally.

When the option has been attached, in step S508, the device configuration change detection unit 222 in the image forming apparatus 100 detects that state, and determines whether the content information about the firmware subject to a version upgrade for which update processing was skipped is stored. If it is determined that the content information about the firmware subject to a version upgrade for which update processing was skipped is stored, the version upgrade condition determination unit 219 in the image forming apparatus 100 performs the following determination. Namely, the version upgrade condition determination unit 219 determines whether there is content information about the firmware subject to a version upgrade corresponding to the new device configuration.

Figure 8:
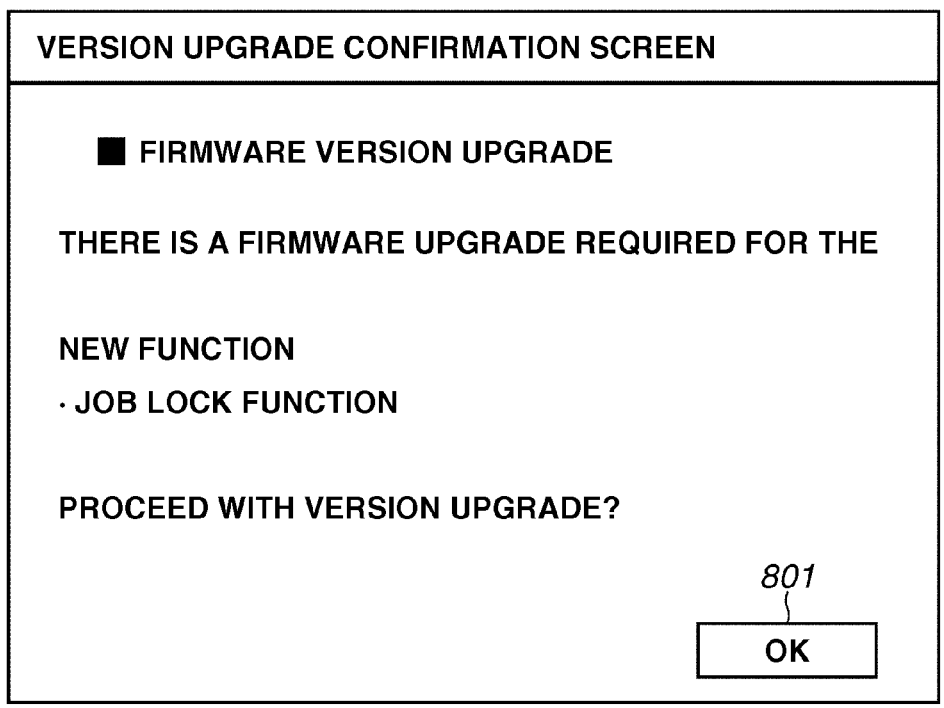
FIG. 8 illustrates an example of a version upgrade confirmation screen displayed on an operation unit in step S704 of FIG. 7.

If the content required for the version upgrade is found, the processing proceeds to step S509. In step S509, the image forming apparatus 100 displays via the operation unit 130 a message as illustrated in FIG. 8 asking the user whether to perform a version upgrade.

In step S510, an instruction to perform a version upgrade is issued by the user 500.

Then, in step S511, the image forming apparatus 100 issues a request to the server apparatus 183 for the update file via the communication processing unit 220.

When the update file request is received, in step S512, the server apparatus 183 transfers the update file to the image forming apparatus 100.

In step S513, the program update processing unit 217 in the image forming apparatus 100 updates the programs in each processing unit in the ROM 112 based on the transferred update file.

Then, in step S514, the image forming apparatus 100 notifies the user via the operation unit 130 that the version upgrade has finished.

Figure 6:
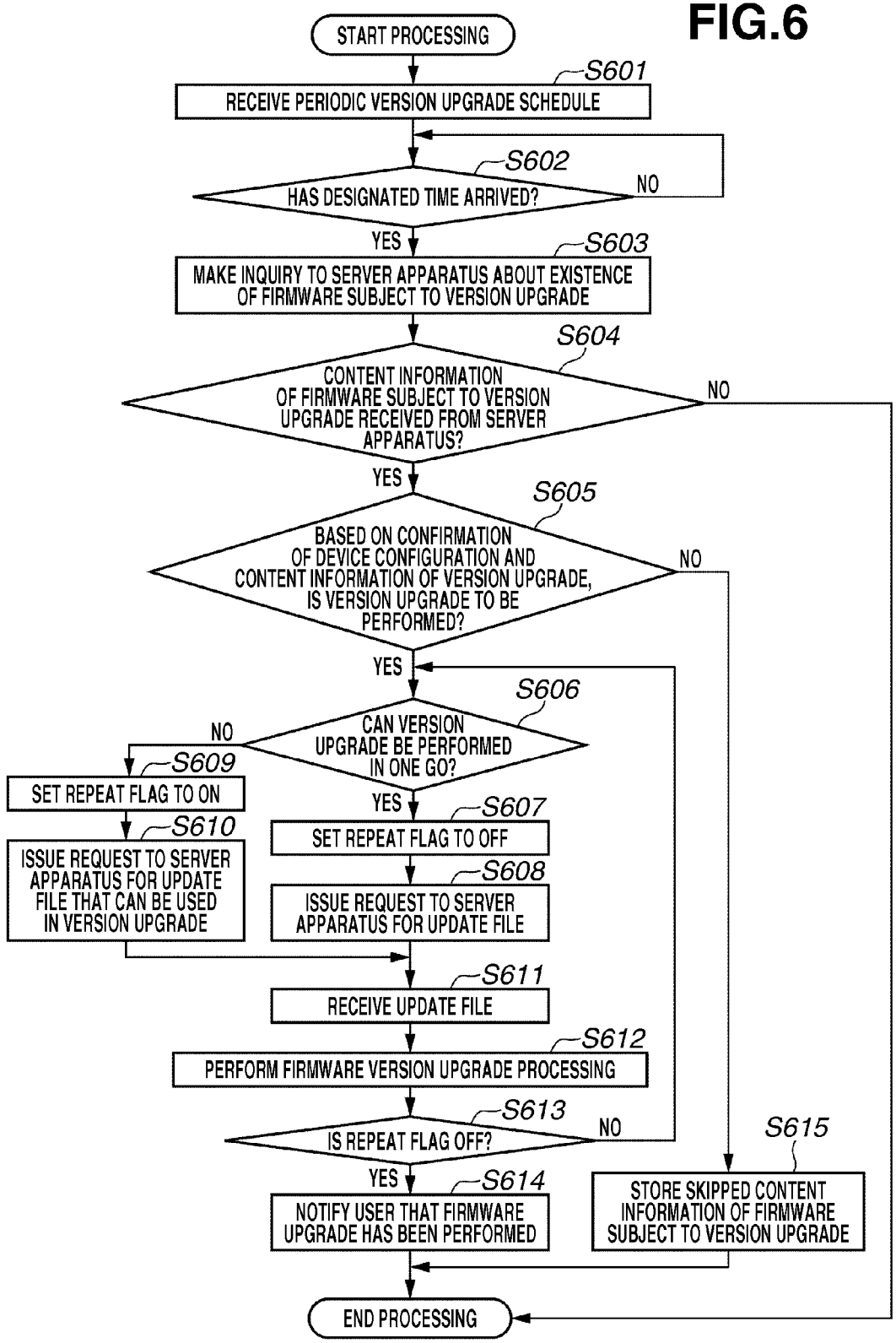
FIG. 6 is a flowchart illustrating an example of firmware update processing according to a first exemplary embodiment.

Now, an outline of the processing performed by the image forming apparatus 100 when determining to execute a version upgrade will be described with reference to the flowchart illustrated in FIG. 6. FIG. 6 is a flowchart illustrating an example of firmware update processing according to the first exemplary embodiment. The following flowchart will be described based on the assumption that the processing is performed by the CPU 111.

In step S601, the CPU 111 receives a periodic version upgrade schedule from the user.

In step S602, the CPU 111 determines whether a designated time has arrived.

If it is determined that the designated time has arrived (YES in step S602), in step S603, the CPU 111 makes an inquiry to the server apparatus 183 about the firmware subject to a version upgrade.

In step S604, the CPU 111 determines whether content information about the firmware subject to a version upgrade has been received from the server apparatus 183. The processing up to this step corresponds to steps S501 to S504 of FIG. 5 in the description of the sequence. The following processing to be performed will now be described in detail.

If it is determined in step S604 that content information about the firmware subject to a version upgrade has not been received (NO in step S604), or a response was received indicating that there is no firmware subject to a version upgrade (NO in step S604), the CPU 111 finishes the processing illustrated in FIG. 6.

On the other hand, if it is determined in step S604 that content information about the firmware subject to a version upgrade has been received (YES in step S604), in step S605, the CPU 111 acquires the device information about the image forming apparatus 100. Then, the CPU 111 determines whether to perform a version upgrade by comparing the received content information about the version upgrade and the acquired device information. If it is determined that there is no need to perform a version upgrade (NO in step S605), as described in step S506 of FIG. 5, the CPU 111 stores the content information about the firmware subject to a version upgrade for which version upgrade processing was skipped.

As an example, the device information about the image forming apparatus 100 before a version upgrade may be in a state like that illustrated by information 401.

For example, if the content information about the firmware subject to a version upgrade received in step S604 corresponds to the content information 301, this means that a staple finisher is connected to the target image forming apparatus 100. Therefore, a version upgrade is required (YES in step S605), so the processing proceeds to step S606.

On the other hand, if the content information about the firmware subject to a version upgrade corresponds to the content information 302, this means that an image analysis board is not connected to the target image forming apparatus 100, and that a job lock function license is not registered either. Therefore, the CPU 111 determines that this version upgrade is a correction for a function that cannot be used. In this case, the CPU 111 does not perform version upgrade processing (NO in step S605), and the processing proceeds to step S615.

Now, the processing performed after the CPU 111 has determined that a version upgrade is necessary, and the processing has proceeded to step S606 will be described.

In step S606, the CPU 111 determines whether the version upgrade can be performed in one go based on the content information about the firmware subject to a version upgrade. For an apparatus having a basic configuration that is not connected to any options, there is a chance that several version upgrades may have been skipped. In such a case, depending on the interdependence among the firmware, the version upgrade may need to be performed in stages. Accordingly, in step S606, the CPU 111 determines whether the version upgrade needs to be performed in stages by confirming the firmware version included in the content information about the firmware subject to a version upgrade in FIG. 3. More specifically, if the device configuration of the image forming apparatus before the version upgrade was a state like that indicated by the table of information 401, the content information about the firmware subject to a version upgrade that was received in step S604 may be a case corresponding to the content information 304. If so, the apparatus to which a FAX expansion option is connected is the version upgrade target. However, since the content information 304 about the firmware subject to a version upgrade indicates that the firmware version is V00.04 or after, the version upgrade cannot be performed in one go.

In this case (NO in step S606), the processing proceeds to step S609. In step S609, the CPU 111 sets a repeat flag to ON.

This repeat flag indicates that the next version upgrade is to be performed, since the version upgrade will be performed in stages. Then, in step S610, the CPU 111 issues a request to the server apparatus 183 for the update file that can be used in the version upgrade. In the above example, the CPU 111 issues a request for the Version.00.04 update file. Then, in step S611, the CPU 111 receives the update file transferred from the server apparatus 183 (update file acquisition). In step S612, the CPU 111 performs firmware update processing.

Then, in step S613, the CPU 111 checks whether the repeat flag is OFF. If the repeat flag is OFF (YES in step S613), since this means that the version upgrade performed in stages has finished, the processing proceeds to step S614. In step S614, the CPU 111 notifies the user via the operation unit 130 that the firmware update has finished, and finishes the processing illustrated in FIG. 6. If it is determined in step S613 that the repeat flag is ON (NO in step S613), the processing returns to step S606, and the CPU 111 again performs the transfer of the update file and the firmware update processing. If the version upgrade can be performed in one go (YES in step S606), in step S607, the repeat flag is set to OFF, and ultimately the processing proceeds to step S614 and the CPU 111 finishes the processing illustrated in FIG. 6.

Figure 7:
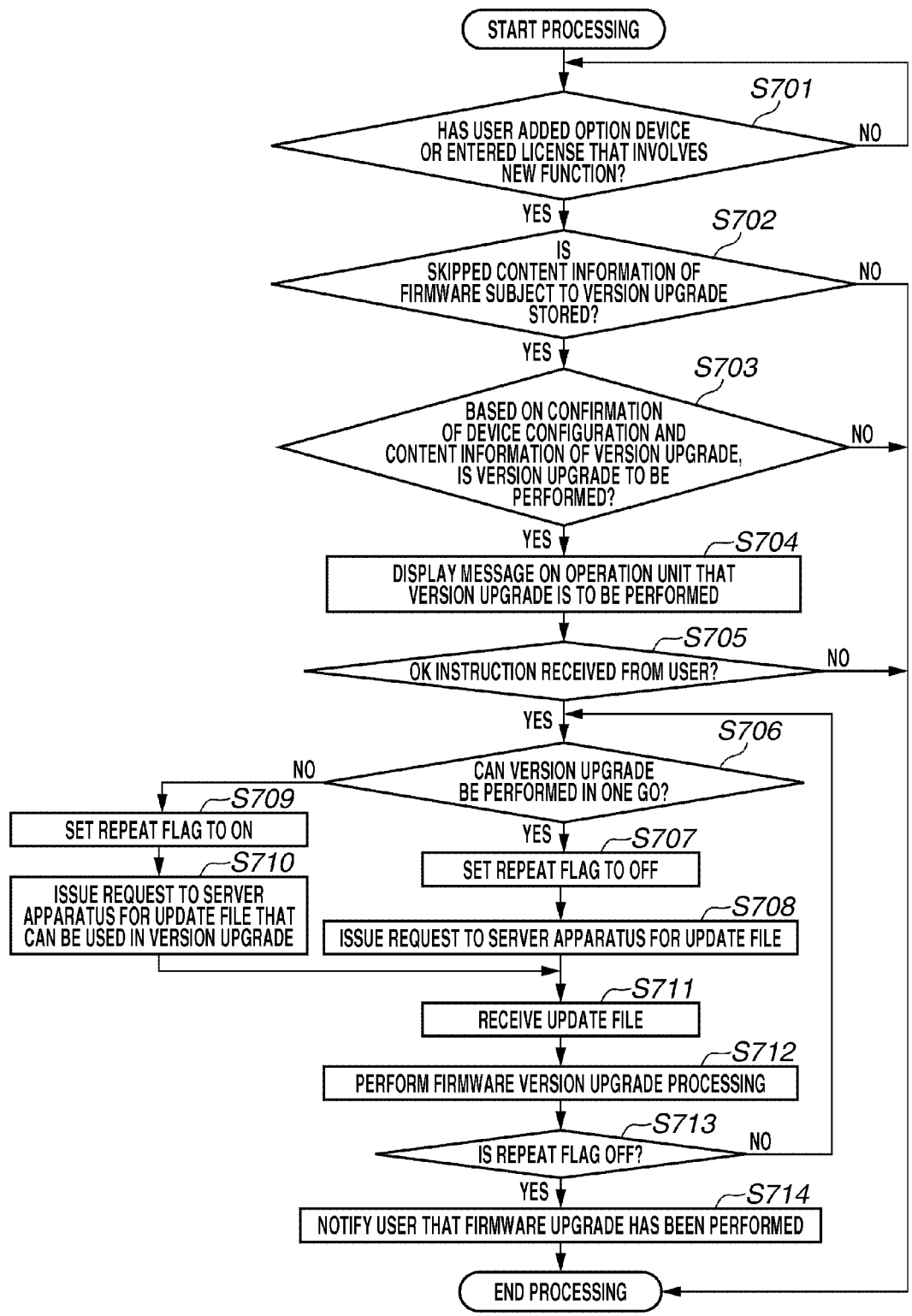
FIG. 7 is a flowchart illustrating an example of processing performed by the image forming apparatus when an option is connected.

Now, the processing performed by the image forming apparatus 100 to which an option or the like is connected will be described with reference to FIG. 7. FIG. 7 is a flowchart illustrating an example of the processing performed by the image forming apparatus 100 when an option is connected thereto.

In step S701, at a given timing, the user adds an option device or enters a license that involves a new function. The CPU 111 detects this change.

In step S702, the CPU 111 determines whether content information about the firmware subject to a version upgrade for which update processing was skipped is stored. The content information about the firmware subject to a version upgrade will be assumed here as being stored after having been subjected to the processing of step S615 as a result of it being determined in the processing of FIG. 6 that a version upgrade was not necessary. If the content information about the firmware subject to a version upgrade is not stored (NO in step S702), the CPU 111 finishes the processing illustrated in FIG. 7 without doing anything. If the content information about the firmware subject to a version upgrade is stored (YES in step S702), the processing proceeds to step S703.

In step S703, the CPU 111 acquires device information that includes the newly added functions that can be provided due to an option device being connected or a license being entered. Further, the CPU 111 determines whether a version upgrade is necessary based on the acquired device information and the stored content information about the firmware subject to a version upgrade. More specifically, for a device configuration like that represented by information 401 in FIG. 4, if, for example, version upgrade update processing for a job lock function like content information 303 in FIG. 3 has been skipped, and if, for example, an image analysis board was added as a hardware option and a job lock function was added as a license in step S701, in this case, a version upgrade condition will be satisfied (YES in step S703). Therefore, the processing proceeds to step S704.

In step S704, the CPU 111 displays, on the operation unit 130, a message illustrated in FIG. 8 as described below. Consequently, the user can be immediately notified that a firmware version upgrade is necessary for the new function.

In step S705, the CPU 111 determines whether an instruction to perform a version upgrade has been issued by the user. If it is determined that an instruction to perform a version upgrade has been issued (YES in step S705), the processing proceeds to step S706. In step S706 the CPU 111 performs update file acquisition and firmware update processing. Since the processing performed in steps S706 to S714 is the same as the processing performed in steps S606 to S614 of FIG. 6, a detailed description thereof will be omitted here.

FIG. 8 illustrates an example of a version upgrade confirmation screen displayed on the operation unit 130 in step S704. As illustrated in FIG. 8, on the version upgrade confirmation screen, a job lock function, for example, is added as a new function and whether there is firmware for that function that requires a version upgrade is displayed. The user confirms the display, and issues an instruction to perform a version upgrade by pressing a button 801. Consequently, in step S705, the image forming apparatus 100 receives that instruction, and performs the firmware update processing.

According to the present exemplary embodiment, in an image forming apparatus to which various functions can be added by the user, unnecessary version upgrades can be prevented from being performed, which allows the downtime of product functions caused by firmware updates to be decreased. Further, even when a function is subsequently added, the fact that a firmware version upgrade is necessary can be quickly notified to the user. In addition, even when a version upgrade cannot be performed in one go because several version upgrades have been skipped, the apparatus can be updated to the required firmware configuration.

In the first exemplary embodiment, an example was described in which whether a version upgrade could be performed was determined by receiving content information about the firmware subject to a version upgrade before receiving the update file from the server apparatus 183. Such processing is to reduce the load of data transfer caused by the reception of update files that have a large amount of data like those for image forming apparatuses.

In a second exemplary embodiment, an example will be described in which the update file request is issued to the server apparatus 183 simultaneously with receiving the version upgrade content, and the update file is received to be stored in the HDD 114.

If the amount of data to be transferred is not large, or if the HDD 114 in the image forming apparatus 100 has a large capacity, when determining whether to perform a version upgrade, the update file is sent in advance, as described above. Consequently, if a version upgrade becomes necessary due to the subsequent addition of a function, the processing of the firmware version upgrade can be performed efficiently using the stored update file without having to communicate with the server apparatus 183.

The processing for simultaneously transferring the version upgrade information with the update file will be described with reference to FIG. 9. FIG. 9 is a flowchart illustrating an example of firmware update processing according to the second exemplary embodiment.

The processing performed in steps S901 to S903 is the same as the above-described processing performed in steps S601 to S603 of FIG. 6.

In step S904, the CPU 111 simultaneously receives the update file and the content information about the firmware subject to a version upgrade from the server apparatus 183. Although the data amount of the update file is quite large compared with the data for the content information about the firmware subject to a version upgrade, since print jobs and the like can continue to be received during transmission processing of the file, this does not cause downtime.

Then, in step S905, the CPU 111 stores the received update file in the HDD 114.

In step S906, the CPU 111 performs a version upgrade condition determination in the same manner as in step S605.

In step S907, the CPU 111 determines whether version upgrade processing can be performed in one go in the same manner as in step S606. The difference with the processing illustrated in FIG. 7 is that, in steps S909 and S911, the CPU 111 reads the update file from the HDD 114, not from the server apparatus 183.

In the processing of FIG. 9, even for content information about the firmware subject to a version upgrade for which update processing was skipped, since the update file is stored in the HDD 114, the need to perform communication with the server apparatus 183 in stages in step S909 or S911 is eliminated. Consequently, the communication amount when the version upgrade is actually performed is decreased, which enables the version upgrade to be performed quickly. The other processing is the same as in FIG. 7.

According to the present exemplary embodiment, in a firmware update in an image forming apparatus, version upgrade processing that is unnecessary, such as correction of a function that is not used by a user, can be prevented from being performed. Therefore, downtime of product functions caused by firmware updates can be decreased.

Further, information about a version upgrade that was not performed in the image forming apparatus is stored therein, and subsequently when a hardware option is added or a license is entered, the image forming apparatus determines again whether a condition is satisfied. Consequently, the user can appropriately upgrade the firmware version for the functions that need to be upgraded, which allows user convenience to be improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-232923 filed Oct. 22, 2012, which is hereby incorporated by reference herein in its entirety.

What is claimed is:

1. An image forming apparatus capable of performing print processing, comprising:
    an update unit configured to update firmware of the image forming apparatus;
    an acquiring unit configured to acquire content information from an external apparatus on a network before the update unit updates the firmware of the image forming apparatus, the content information being used by the image forming apparatus to identify a content of correction to be executed by updating the firmware of the image forming apparatus; and
    a determination unit configured to determine based on the content information acquired by the acquiring unit whether to update the firmware of the image forming apparatus,
    wherein the determination unit determines not to update the firmware of the image forming apparatus if the content of correction identified from the content information is correction of a problem with an option unit not connected to the image forming apparatus.

2. The image forming apparatus according to claim 1, wherein the option unit is a finisher apparatus for performing finishing processing on a sheet on which the print processing has been performed.

3. A method for controlling an image forming apparatus capable of performing print processing, comprising:
    acquiring content information from an external apparatus on a network before an update of firmware of the image forming apparatus, the content information being used by the image forming apparatus to identify a content of correction to be executed by updating the firmware of the image forming apparatus; and
    determining based on the acquired content information whether to update the firmware of the image forming apparatus;
    wherein, f the content of correction identified from the content information is correction of a problem with an option unit not connected to the image forming apparatus, determining not to update the firmware of the image forming apparatus.

4. A storage medium that stores a program for executing on a computer the method for controlling an image forming apparatus capable of performing print processing according to claim 3.

5. The image forming apparatus according to claim 2, wherein the finishing processing is any one of stapling, punching, and saddle stitch bookbinding.

6. The image forming apparatus according to claim 1, wherein the option unit is an image analysis board.

7. The image forming apparatus according to claim 1, wherein the option unit is a facsimile unit.

8. The image forming apparatus according to claim 1, wherein the determination unit determines to update the firmware of the image forming apparatus if the content of correction identified from the content information is correction of a problem with an option unit connected to the image forming apparatus.

9. The image forming apparatus according to claim 1, wherein if the determination unit determines to update the firmware of the image forming apparatus, the acquiring unit acquires an update file from the external apparatus, and the update unit updates the firmware of the image forming apparatus based on the update file acquired by the acquiring unit.

10. The image forming apparatus according to claim 1, wherein when an update time designated by a user has been reached, the acquiring unit acquires the content information from the external apparatus.

* * * * *